(12) United States Patent
Yalamanchili

(10) Patent No.: US 11,652,902 B2
(45) Date of Patent: May 16, 2023

(54) MANAGING MOBILE NOTIFICATIONS RECEIVED VIA A WIRELESS COMMUNICATION NETWORK

(71) Applicant: T-Mobile USA, Inc., Bellevue, WA (US)

(72) Inventor: Kalyan C. Yalamanchili, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 58 days.

(21) Appl. No.: 17/087,945

(22) Filed: Nov. 3, 2020

(65) Prior Publication Data

US 2021/0051209 A1 Feb. 18, 2021

Related U.S. Application Data

(63) Continuation of application No. 15/678,866, filed on Aug. 16, 2017, now Pat. No. 10,834,217.

(51) Int. Cl.
| | |
|---|---|
| *H04L 67/55* | (2022.01) |
| *H04W 88/18* | (2009.01) |
| *H04L 67/303* | (2022.01) |
| *H04L 51/214* | (2022.01) |
| *H04W 4/14* | (2009.01) |
| *H04W 4/12* | (2009.01) |
| *G06F 16/9535* | (2019.01) |

(52) U.S. Cl.
CPC ............ *H04L 67/55* (2022.05); *H04L 51/214* (2022.05); *H04L 67/303* (2013.01); *H04W 88/184* (2013.01); *G06F 16/9535* (2019.01); *H04W 4/12* (2013.01); *H04W 4/14* (2013.01)

(58) Field of Classification Search
CPC ....... H04L 67/26; H04L 51/14; H04L 67/303; H04W 88/184; H04W 4/12; H04W 4/14; G06F 16/9535
See application file for complete search history.

(56) References Cited

U.S. PATENT DOCUMENTS

| | | |
|---|---|---|
| 6,148,332 A | 11/2000 | Brewer et al. |
| 6,275,862 B1 | 3/2001 | Sharma et al. |
| 6,772,208 B1 | 3/2004 | Dutta |
| 6,934,738 B1 | 3/2005 | Furusawa et al. |
| 7,216,092 B1 | 5/2007 | Weber et al. |

(Continued)

OTHER PUBLICATIONS

Crsipin "Internet Message Access Protocol—Version 4", University of Washington, Dec. 1994, retrieved Mar. 12, 2019 at «https://tools.ietf.org/html/rfc1730», RFC 1730, 78 pgs.

(Continued)

*Primary Examiner* — Austin J Moreau
(74) *Attorney, Agent, or Firm* — Lee & Hayes, P.C.

(57) ABSTRACT

Mobile devices often receive mobile notifications via a wireless communication network. The mobile notifications may relate to apps operating on the mobile devices. Techniques described herein allow users to manage such mobile notifications by defining, at a mobile device, preferences for managing mobile notifications related to apps operating on the mobile device. The mobile device receives, via a wireless communication network, the mobile notifications. Based at least in part on the preferences, the mobile notifications received at the mobile device are managed.

20 Claims, 4 Drawing Sheets

(56) References Cited

U.S. PATENT DOCUMENTS

| | | | |
|---|---|---|---|
| 7,283,813 B2 * | 10/2007 | Hamanaga | H04M 1/56 455/412.2 |
| 7,395,329 B1 | 7/2008 | Holt et al. | |
| 7,433,920 B2 | 10/2008 | Blagsvedt et al. | |
| 7,466,810 B1 | 12/2008 | Quon et al. | |
| 8,346,953 B1 | 1/2013 | Hew et al. | |
| 8,819,587 B1 | 8/2014 | Shrum et al. | |
| 9,177,293 B1 | 11/2015 | Gagnon et al. | |
| 9,374,266 B1 | 8/2016 | Dellecave, Jr. et al. | |
| 9,571,428 B2 | 2/2017 | Feinberg et al. | |
| 10,055,747 B1 | 3/2018 | Sherman et al. | |
| 10,083,222 B1 | 9/2018 | Katzer | |
| 10,198,408 B1 | 2/2019 | Commisso | |
| 2002/0101453 A1 | 3/2002 | Nixon et al. | |
| 2002/0087704 A1 | 7/2002 | Chesnais et al. | |
| 2002/0194379 A1 | 12/2002 | Bennett et al. | |
| 2003/0097596 A1 | 5/2003 | Muratov et al. | |
| 2004/0152477 A1 | 3/2004 | Wu et al. | |
| 2004/0087300 A1 | 5/2004 | Lewis | |
| 2004/0181604 A1 | 9/2004 | Immonen | |
| 2004/0243680 A1 | 12/2004 | Mayer | |
| 2005/0038708 A1 | 2/2005 | Wu | |
| 2005/0257261 A1 | 11/2005 | Shraim et al. | |
| 2006/0122957 A1 | 5/2006 | Chen | |
| 2006/0168001 A1 | 7/2006 | Lasater et al. | |
| 2006/0168549 A1 | 7/2006 | Chan et al. | |
| 2007/0165790 A1 | 7/2007 | Taori | |
| 2007/0294352 A1 | 12/2007 | Shraim et al. | |
| 2008/0033922 A1 | 2/2008 | Cisler et al. | |
| 2008/0034011 A1 | 2/2008 | Cisler et al. | |
| 2008/0085700 A1 | 4/2008 | Arora | |
| 2008/0183814 A1 | 7/2008 | Sanghavi | |
| 2009/0175264 A1 | 7/2009 | Reitalu et al. | |
| 2009/0249247 A1 | 10/2009 | Tseng et al. | |
| 2009/0287701 A1 | 11/2009 | Breaker et al. | |
| 2009/0327429 A1 | 12/2009 | Hughes et al. | |
| 2010/0088382 A1 | 4/2010 | Lee et al. | |
| 2011/0171936 A1 | 7/2011 | Khoury | |
| 2011/0307804 A1 | 12/2011 | Spierer | |
| 2012/0059887 A1 | 3/2012 | Oberle et al. | |
| 2012/0209922 A1 | 3/2012 | Bhatia et al. | |
| 2013/0007665 A1 * | 1/2013 | Chaudhri | G06F 3/04883 715/833 |
| 2013/0097279 A1 | 4/2013 | Polis et al. | |
| 2013/0148504 A1 | 6/2013 | Ungureanu | |
| 2014/0059448 A1 | 2/2014 | Lee | |
| 2014/0067702 A1 | 3/2014 | Rathod | |
| 2014/0122227 A1 | 5/2014 | Reinshagen | |
| 2014/0136506 A1 | 5/2014 | Ratner et al. | |
| 2014/0181274 A1 | 6/2014 | Bazin et al. | |
| 2014/0280616 A1 | 9/2014 | Ramanathan et al. | |
| 2014/0282869 A1 | 9/2014 | Dabbiere | |
| 2014/0304622 A1 | 10/2014 | Jorasch et al. | |
| 2014/0349627 A1 | 11/2014 | Choi et al. | |
| 2015/0006677 A1 | 1/2015 | Mahajan et al. | |
| 2015/0177970 A1 * | 6/2015 | Choi | H04M 1/72403 715/752 |
| 2015/0256679 A1 | 9/2015 | Burnett et al. | |
| 2015/0288775 A1 | 10/2015 | Larabie-Belanger | |
| 2015/0339307 A1 | 11/2015 | Hultgren et al. | |
| 2015/0350129 A1 * | 12/2015 | Cary | H04L 67/52 709/206 |
| 2016/0161964 A1 | 6/2016 | Sato et al. | |
| 2016/0191446 A1 | 6/2016 | Grol-Prokopczyk et al. | |
| 2017/0046024 A1 | 2/2017 | Dascola et al. | |
| 2017/0075737 A1 | 3/2017 | Kim et al. | |
| 2017/0083226 A1 * | 3/2017 | Cho | G06F 3/04842 |
| 2017/0163781 A1 | 6/2017 | Seshan | |
| 2017/0263036 A1 | 9/2017 | Kurisu et al. | |
| 2017/0293414 A1 * | 10/2017 | Pierce | G06F 3/0488 |
| 2017/0300194 A1 * | 10/2017 | Lee | G06F 3/04817 |
| 2018/0075008 A1 | 3/2018 | Ganta et al. | |
| 2018/0091456 A1 * | 3/2018 | Weinberg | H04L 51/24 |
| 2018/0241702 A1 | 3/2018 | Liu | |
| 2018/0137197 A1 | 5/2018 | Kumar et al. | |
| 2018/0188935 A1 | 7/2018 | Singh et al. | |
| 2018/0357728 A1 * | 12/2018 | Huening | H04L 67/22 |
| 2018/0359244 A1 | 12/2018 | Cockerill et al. | |
| 2018/0359612 A1 | 12/2018 | Buckley et al. | |
| 2019/0035242 A1 | 1/2019 | Vazirani | |
| 2019/0058771 A1 | 2/2019 | Yalamanchili | |

OTHER PUBLICATIONS

Dictionary.com, 'et cetera', definitions. Year 2019, in Final Office Action dated Oct. 1, 2019, U.S. Appl. No. 15/678,866, 1 page.

Dictionary.com, 'etc', definitions, Year 2019, in Final Office Action dated Oct. 1, 2019, U.S. Appl. No. 15/678,866, 1 page.

Dictionary.com, 'preference', definition of, Year 2019, in Final Office Action dated Oct. 1, 2019, U.S. Appl. No. 15/678,866, 1 page.

Merriam-Webster, "prefer", Year 2020, in Jul. 22, 2020 Notice of Allowance, U.S. Appl. No. 15/678,866, 1 page.

Merriam-Webster, "preference", Year 2020m in Jul. 22, 2020 Notice of Allowance, U.S. Appl. No. 15/678,866, 1 page.

Microsoft, Computer Dictionary, "preference", Fifth Edition, p. 417, 2002, in Final Office Action dated Oct. 1, 2019, U.S. Appl. No. 15/678,866, 3 pages.

Office Action for U.S. Appl. No. 15/678,866, dated Feb. 18, 2020, Yalamanchili, "Managing Mobile Notifications Received Via a Wireless Communication Network", 41 Pages.

Office Action for U.S. Appl. No. 15/678,866, dated Oct. 1, 2019, Yalamanchili, "Managing Mobile Notifications Received Via a Wireless Communication Network"., 37 pages.

Office Action for U.S. Appl. No. 15/678,866 dated Mar. 18, 2019, Yalamanchili, "Managing Mobile Notifications Received Via a Wireless Communication Network", 23 pages.

Resnick, "Internet Message Format", RFC 2822, 2001, 52 pgs.

Rosenberg, et al., "SIP: Session Initiation Protocol", RFC 3261, 2002, 270 pgs.

Schulzrinne, "RPID: Rich Presence Extensions to the Presence Information Data Format (PIDF)", Cisco, Jul. 2006, retrieved on Mar. 12, 2019 at «https//tools. ietf. org/html/rfc4480», RFC 4480, 38 pgs.

Schulzrinne, "Timed Presence Extensions to the Presence Information Data Format (PIDF) to Indicate Status Information for Past and Future Time Intervals", Columbia U., Jul. 2006, retrieved Mar. 12, 2019 at «https://tools. ietf. org/html/rfc4481», RFC 4481, 10 pgs.

* cited by examiner

US 11,652,902 B2

MANAGING MOBILE NOTIFICATIONS RECEIVED VIA A WIRELESS COMMUNICATION NETWORK

CROSS REFERENCE TO RELATED APPLICATIONS

This is a continuation application which claims priority to commonly assigned, co-pending U.S. patent application Ser. No. 15/678,866, filed Aug. 16, 2017. Application Ser. No. 15/678,866 is fully incorporated herein by reference.

BACKGROUND

In recent years, mobile telecommunication devices ("mobile devices") have advanced from offering simple voice calling services within wireless communication networks to providing users with many new features. Mobile devices now provide messaging services such as email, text messaging, and instant messaging; data services such as Internet browsing; media services such as storing and playing a library of favorite songs; location services; and many others. Thus, mobile devices, also referred to herein as user devices, are often used in multiple contexts. In addition to the new features provided by the mobile devices, users of such mobile devices have greatly increased. Such an increase in users is only expected to continue and in fact, it is expected that there could be a growth rate of twenty times more users in the next few years alone.

In wireless communication networks, mobile devices generally include numerous applications ("apps") and/or subscriptions to various sites, such as websites on the Internet. For example, a user of a mobile device may include several apps that are directed to various news sites such as, for example, CNN, MSNBC, local television stations, etc. Additionally, the user may include apps on a mobile device that are directed to various types of websites such as, for example, sporting sites, entertainment sites, search sites (e.g., Yahoo), etc. The apps generally allow for and configure the mobile device to receive mobile notifications or alerts related to the apps. For example, a sports site may send a mobile notification related to a story at the sports site, breaking news, etc. Similarly, for news sites, entertainment sites, etc., mobile notifications may also provide information regarding news, an event, etc., that may be of interest to the user. Accordingly, based upon the number of apps a user includes on their mobile device and that provide such mobile notifications, a user's mobile device may become inundated with mobile notifications, which can be distracting to the user and clutter a display of the mobile device.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for managing mobile notifications received over a wireless communication network on mobile devices. For example, the techniques may include the ability to clear all mobile notifications with a single request, where the user is then presented with a warning requesting verification from the user to actually clear all notifications. Additionally, it may be possible for the user to retrieve one or more, or even all, of the cleared notifications. Additionally, the techniques allow for automatic organization of mobile notifications based upon various factors and user preferences. For example, the mobile notifications may be organized with respect to aspects of an app to which the mobile notifications relate. Additionally, mobile notifications may be grouped and organized within folders based upon an app to which the mobile notifications relate. A user may be able to designate certain mobile notifications as favorite mobile notifications. Also, a user may define preferences such that only a certain number of mobile notifications are kept. Mobile notifications having similar content may be automatically cleared and criteria may be set to allow for the user to define which mobile notifications to keep.

Figure 1B:
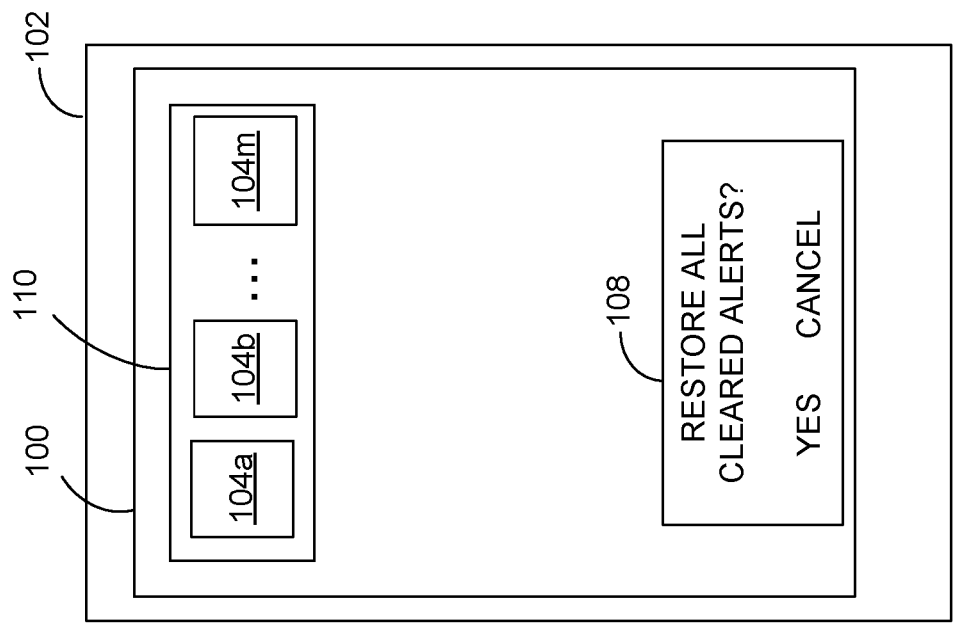
FIGS. 1A-1D schematically illustrate screen shots of a display of a mobile device displaying mobile notifications, in accordance with various configurations.
Figure 1A:
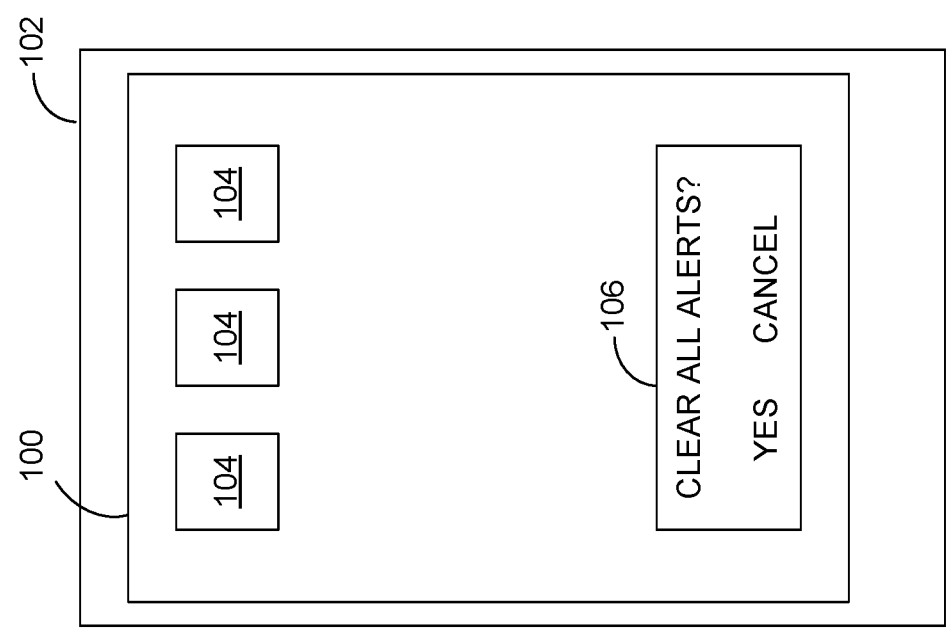

FIG. 1A schematically illustrates a display 100 of a mobile device 102 configured for operation within a wireless communication network (not illustrated). The mobile device 102 may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, as well as desktop computers, devices configured as Internet of Things (IoT) devices, integrated devices combining one or more of the preceding devices, and/or the like. As such, the mobile devices 102 may range widely in terms of capabilities and features. For example, one of the mobile devices 102 may have a numeric keypad, a capability to display only a few lines of text and be configured to interoperate with only GSM networks. However, another of the mobile devices 102 (e.g., a smart phone) may have a touch-sensitive screen, a stylus, an embedded GPS receiver, and a relatively high-resolution display, and be configured to interoperate with multiple types of networks. The mobile devices may also include SIM-less devices (i.e., mobile devices that do not contain a functional subscriber identity module ("SIM")), roaming mobile devices (i.e., mobile devices operating outside of their home access networks), and/or mobile software applications.

The wireless communication network may be configured as one of many types of networks and thus may communicate with the mobile devices 102 using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like. In configurations, as previously noted, the wireless communication network 100 may be include an IMS 100*a* and thus, may provide various services such as, for example, voice over long term evolution (VoLTE) service, video over long term evolution (ViLTE) service, rich communication services (RCS) and/or web real time communication (Web RTC).

As previously noted, mobile devices 102 generally include numerous applications ("apps") and/or subscriptions to various sites, such as websites on the Internet. For example, a user of a mobile device 102 may include several apps that are directed to various news sites such as, for example, CNN, MSNBC, local television stations, etc. Additionally, the user may include apps on the mobile device 102 that are directed to various other types of websites such as, for example, sporting sites, entertainment sites, search sites (e.g., Yahoo), etc. The apps generally allow for and configure the mobile device 102 to receive mobile notifications or alerts 104 related to the apps. For example, a sports site may send a mobile notification 104 related to breaking news, a story at the sports site, etc. Similarly, for news sites, entertainment sites, etc., mobile notifications 104 may also provide information regarding news, an event, new content, etc., that may be of interest to the user.

The mobile notifications 104 are displayed on the display 100 of the mobile device 102. A user of the mobile device 102 may interact with a mobile notification 104 to access further content related to the mobile notification 104, generally located at a website that sent the mobile notification 104. For example, the mobile notification 104 may include a link to access the website.

After the user has read and/or interacted with the mobile notification 104, or even if the user decides not to read and/or interact with the mobile notification 104, the user may clear the mobile notification 104 from the display 100 and the mobile device 102. The user may interact with some type of user interface ("UI") (e.g., the display may be configured as a touchscreen, the mobile device 102 may include a keyboard, the mobile device 102 may respond to audio input, etc.). Thus, the user may indicate a desire via the UI to clear all mobile notifications 104 from the display 100 and the mobile device 102.

In accordance with configurations, once the mobile device 102 has received input from the user to clear all mobile notifications 104, the mobile device 102 may display a notification or alert 106 requesting the user to verify that the user does indeed wish to clear all mobile notifications 104. The user may then provide input verifying that the user does wish to clear all mobile notifications 104. The user may also provide input to cancel the clearing of all mobile notifications. Once again, the input may be via a UI such as, for example, a touchscreen interface of the display 100, a keyboard, audible input, etc.

Referring to FIG. 1B, in accordance with configurations, the user may be able to recover or undo mistakenly cleared mobile notifications 104. For example, the user may interact with the UI on the mobile device, e.g., a touchscreen interface of the display 100, requesting that all cleared mobile notifications be restored based upon an icon 108. Alternatively, the user may be able to view cleared mobile notifications 104 and individually select cleared mobile notifications 104 for reinstatement to the mobile device 102.

A list 110 of cleared mobile notifications 104*a*, 104*b*, . . . , 104*m* may be maintained for a predetermined amount of time that may be determined or configured as a preference by the user of the mobile device 102. Also, the undo of clearing of mobile notifications 104 option may be provided to the user immediately upon clearing of mobile notifications 104 and may be presented for a predetermined amount of time that may be determined or configured as a preference by the user of the mobile device 102.

Figure 1D:
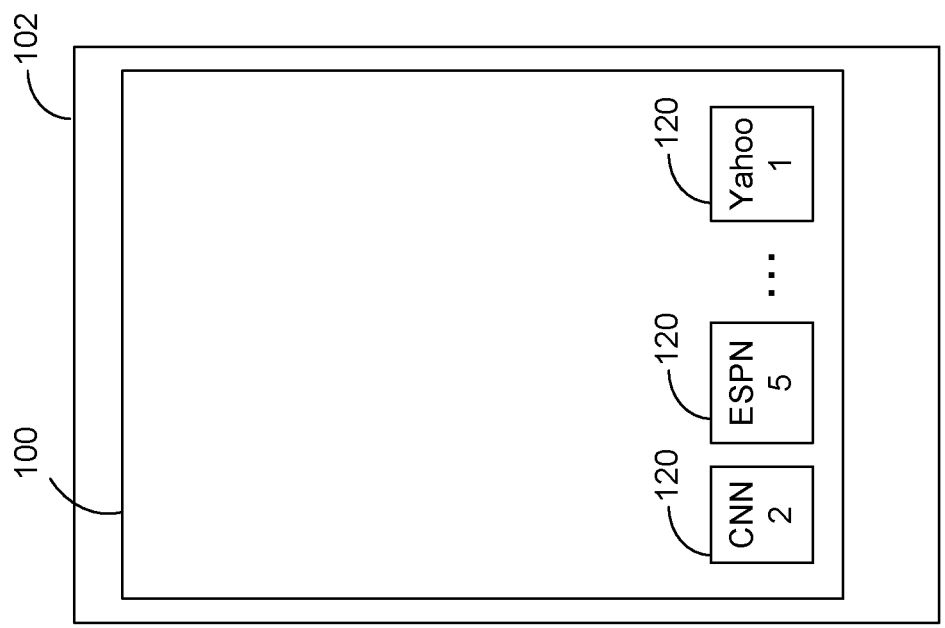
Figure 1C:
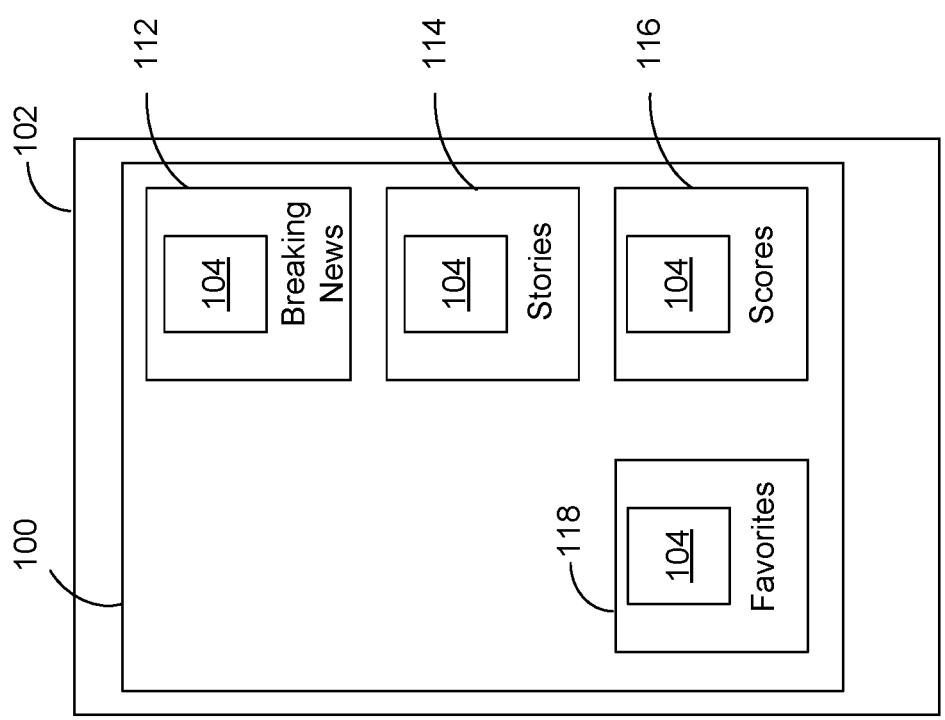

Referring to FIG. 1C, in accordance with configurations, a user may be able to define preferences to categorize mobile notifications 104 into separate groups per app to which the mobile notifications 104 relate. For example, for an app related to a sports website, the user may be able to indicate that mobile notifications 104 pertaining to breaking news are a first category 112, general stories are a second category 114, scores are a third category 116, etc. The mobile notifications 104 may then be grouped into folders stored in memory of the mobile device 102 (which may be schematically represented by 112, 114 and 116 in FIG. 1C) based on the category and may be retrieved by the user for display on the display 100. In configurations, the mobile notifications may simply be labeled based on the category rather than organized into folders.

In accordance with configurations, the user may select and label mobile notifications 104 as a favorite. In a configurations, mobile notifications 104 that are indicated or labeled as a favorite may be moved to a folder 118 stored in memory of the mobile device 102 that allows the user to read and access the mobile notifications 104 later by accessing the folder 118 for display on the display 100. Additionally, the user may set preferences that indicate that favorite mobile notifications 104 are to be automatically shared with certain contacts of the user provided on the mobile device 102.

Additionally, in configurations, mobile notifications 104 having a certain subject or category, e.g., categories 112, 114, 116, may be designated by user preferences as mobile notifications 104 for automatically sharing ("auto-sharing") with various contacts of the user. Such mobile notifications 104 that are designated for auto-sharing may be automatically forwarded to the contacts by the mobile device 102. In configurations, mobile notifications 104 that have been labeled as favorites may be automatically shared with various contacts designated by the user at fixed time intervals. For example, the fixed intervals of time may be at the end of the day, weekly, monthly, quarterly, yearly, hourly, etc. Additionally, the user may manually select and share one or more, even all, mobile notifications 104 for sharing with one or more contacts of the user. Also, mobile notifications 104 that have been designated as favorite mobile notifications may be recovered after clearing them.

In configurations, a user may also define a preference that mobile notifications 104 including similar content may be automatically cleared. The similar content mobile notifications 104 may be related to a particular app or may be related to different apps. As an example, keyword matching criteria may be utilized in order to designate mobile notifications 104 as including similar content. For example, if mobile notifications 104 include 50 or 75 percent or more of keywords, then they may be deemed to include similar content.

For mobile notifications 104 that are deemed to be directed to similar content, the user may define a preference that the last or most recently received mobile notification 104 that includes similar content is to be kept. Thus, a subsequent mobile notification 104 that arrives with similar content, then the currently kept mobile notification 104 is deleted and the subsequently received mobile notification 104 is kept. Additionally, the user may define a preference to keep mobile notifications 104 that have similar content based upon a length of the mobile notifications 104. For example, shorter or longer mobile notifications 104 may be defined as a preference for keeping mobile notifications 104 that include similar content.

In configurations, the user may also designate to automatically clear mobile notifications 104 that include similar content at predetermined time intervals. For example, a user may designate to clear mobile notifications 104 containing similar content every 15 minutes. The user may designate such automatic clearing of mobile notifications 104 with similar content to occur more frequently or less frequently depending upon user preference. In accordance with configurations, the user may retrieve one, multiple or even all automatically cleared mobile notifications 104 that include similar content for a certain period of time if at a later time, the user wishes to view the mobile notifications 104. The user may then clear the retrieved mobile notifications 104 as desired.

In configurations, a user may define preferences for blocking mobile notifications 104 that include certain types of content based upon keywords. Such blocking may be defined for a limited amount of time or forever. Additionally, the user may decide to unblock receipt of mobile notifications 104 previously defined as being automatically blocked. The user may define the content of mobile notifications 104 to block by highlighting a keyword or words, phrases, etc., in a received mobile notification 104 and define a preference to block all future mobile notifications 104 that include such content for a limited amount of time, or even forever.

Referring to FIG. 1D, in configurations, mobile notifications 104 may be organized or grouped automatically under an app logo, app name, etc., e.g., in folders 120. When the app logo or name is selected by the user via a UI, the mobile notifications 104 may be ungrouped and individually displayed on the display 100. The app logo or name may also include an indicator indicating a number of mobile notifications 104 currently grouped under the app logo or app name.

In addition, in configurations, only the most recent received mobile notifications 104 may be currently displayed on the display 100 of the mobile device 102. Thus, when a subsequent mobile notification 104 arrives, the oldest mobile notification 104 displayed on the display 100 may be grouped and placed in the appropriate folder 120 based upon the app logo or name. Likewise, when a mobile notification 104 is cleared from the display 100, then the most recent mobile notification 104 grouped and stored in the corresponding folder 120 related to the cleared mobile notification 104 (or simply the most recent mobile notification 104 regardless of the related app, depending on defined preferences of the user) may now be displayed on the display 100. The user may define a preference for the number of mobile notifications 104 to be currently displayed on the display 100. For example, the user may define that only the ten most recent mobile notifications 104 should be displayed on the display 100. Additionally, a default may be provided for the number of mobile notifications 104 to be displayed on the display 100 at one time. In configurations, a default may be, for example, five mobile notifications 104 to be displayed.

In configurations, the user may search mobile notifications 104 on the mobile device 102 based upon keywords, phrases, etc. The user may then clear mobile notifications 104 based upon the result of the search, or may read and/or interact with the resultant mobile notifications 104.

In configurations, cleared mobile notifications 104 may be stored and/or maintained in memory or storage of the mobile device for a predetermined amount of time, which may be defined as a preference of the user or may be set as a default. Also, in configurations, the mobile device 102 may display mobile notifications 104 on a designated screen view for displaying mobile notifications 104, if selected, on the display 100. Mobile notifications 104 may still be displayed on the display 100 for other screen views, as is known.

Figure 2:
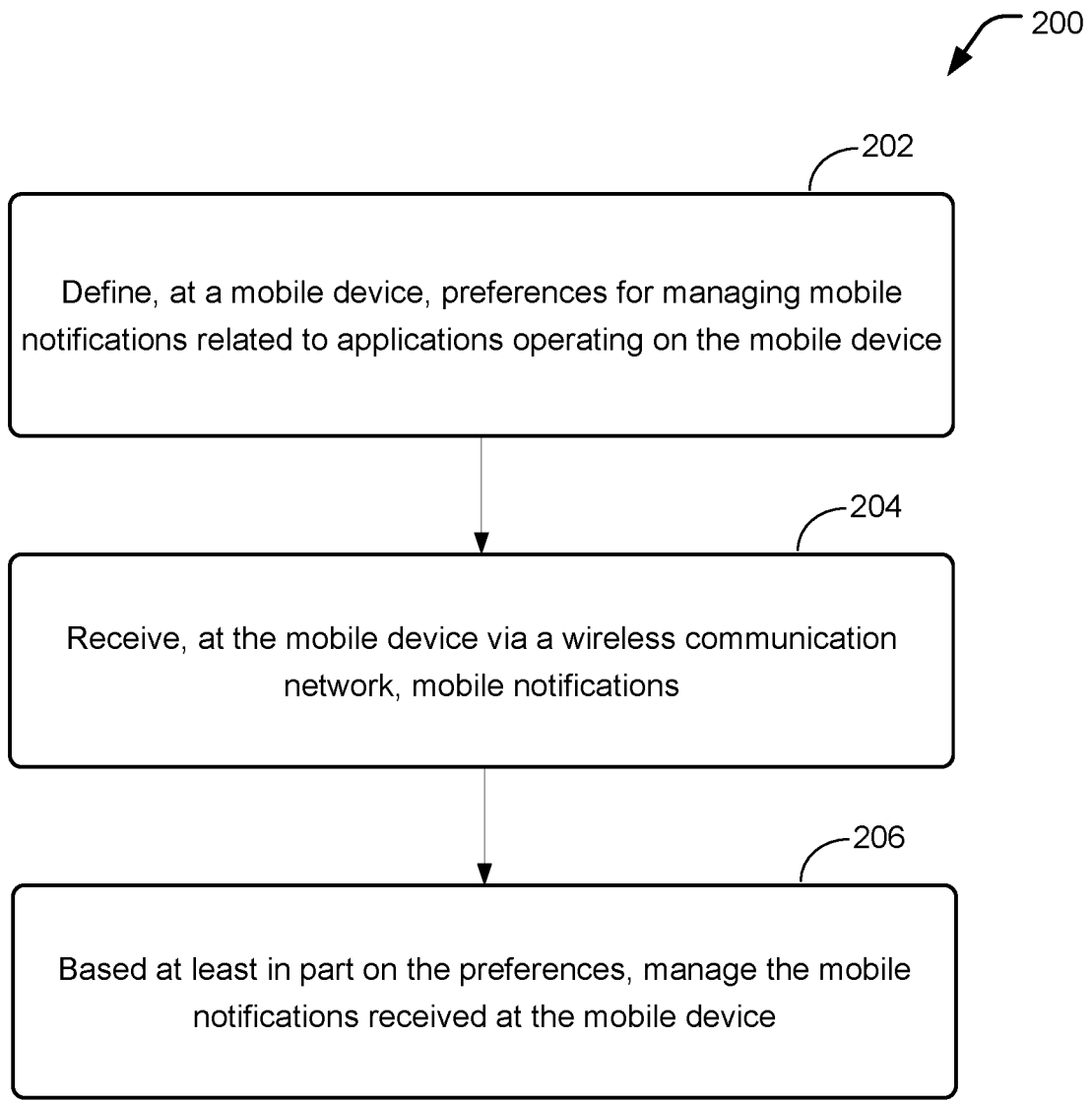
FIG. 2 is a flowchart illustrating an example method of managing mobile notifications received by a mobile device via a wireless communication network, in accordance with various configurations.

FIG. 2 is a flow diagram of an illustrative process that may be implemented using the mobile device 102. This process (as well as other processes described throughout) are illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processors and processing cores in other environments and computing devices.

FIG. 2 is a flowchart illustrating an example method 200 of managing mobile notifications, e.g., mobile notifications 104, received by a mobile device, e.g., mobile device 102, via a wireless communication network. As illustrated, at block 202, preferences are defined at the mobile device for managing mobile notifications related to applications operating on the mobile device. At block 204, a notification of an incoming call directed to the telecommunication services subscriber is received by the IMS node. At block 206, responsive to the notification, service logic is utilized by the IMS node to perform an action with respect to the incoming call based on the service profile.

Thus, by utilizing techniques described herein with respect to setting user preferences for mobile notifications 104, based upon the preferences, time may be saved for the user in reading, clearing, and sharing of mobile notifications 104. Furthermore, manual repetitive actions can be avoided in cleaning up unwanted mobile notifications 104. Additionally, the display 100 of the mobile device 102 may be kept "clean" by minimizing the number of mobile notifications 104 displayed thereon. Distractions may also be minimized by avoiding spending time on mobile notifications 104 when the receipt of mobile notifications 104 is high and/or virtually continuous. The techniques also allow for improving the user's ability to quickly share information across contacts (e.g., auto-sharing of mobile notifications 104), thereby increasing more engagement with the contacts. The techniques also allow for automatically managing, grouping, and organizing mobile notifications 104 related to apps effectively and automatically clearing mobile notifications 104 that include similar content. The techniques may also reduce distraction by reducing the number of mobile notifications 104 that may be saved and/or displayed.

Figure 3:
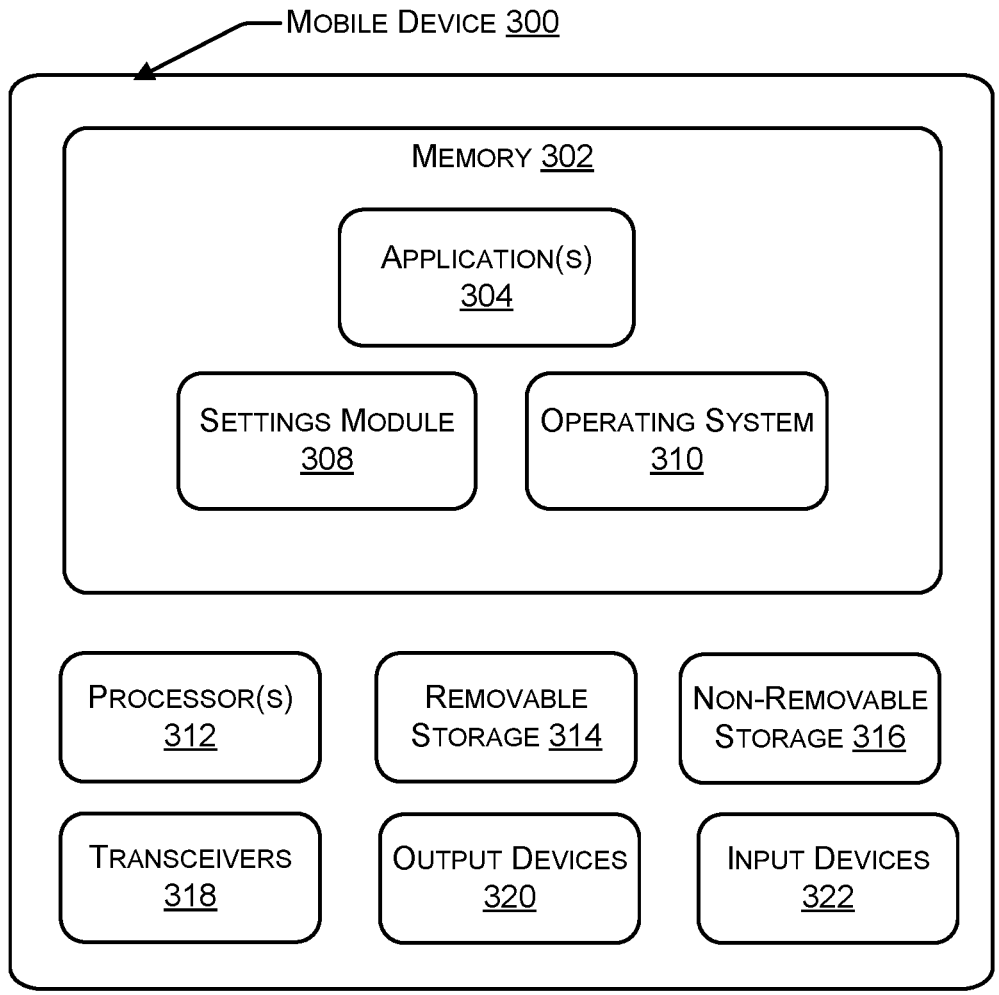
FIG. 3 illustrates a component level view of an example mobile device configured for use in a wireless communication network.

FIG. 3 schematically illustrates a component level view of a mobile device 300, such as mobile device 102, configured to function within a wireless communication network and receive and manage mobile notifications 104. As illustrated, the mobile device 300 comprises a system memory 302 storing application(s) or apps 304, a settings module 308, and an operating system 310. Also, the mobile device 300 includes processor(s) 312, a removable storage 314, a non-removable storage 316, transceivers 318, output device(s) 320, and input device(s) 322. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The mobile device 300 may also include additional data storage devices (removable and/or non-removable) such as, for example, magnetic disks, optical disks, or tape. Such additional data storage may include removable storage 314 and non-removable storage 316.

Non-transitory computer-readable media may include volatile and nonvolatile, removable and non-removable tangible, physical media implemented in technology for storage of information, such as computer readable instructions, data structures, program modules, or other data. System memory 302, removable storage 314 and non-removable storage 316 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 300. Any such non-transitory computer-readable media may be part of the user device 300. The processor(s) 312 may be configured to execute instructions, which may be stored in the non-transitory computer-readable media or in other computer-readable media accessible to the processor(s) 312.

In some implementations, the transceivers 318 include any sort of transceivers known in the art. For example, the transceivers 318 may include a radio transceiver that performs the function of transmitting and receiving radio frequency communications via an antenna. Also or instead, the transceivers 318 may include wireless modem(s) to may facilitate wireless connectivity with other computing devices. Further, the transceivers 318 may include wired communication components, such as an Ethernet port, for communicating with other networked devices.

In some implementations, the output devices 320 include any sort of output devices known in the art, such as a display (e.g., a liquid crystal display), speakers, a vibrating mechanism, or a tactile feedback mechanism. Output devices 320 also include ports for one or more peripheral devices, such as headphones, peripheral speakers, or a peripheral display.

In various implementations, input devices 322 include any sort of input devices known in the art. For example, input devices 322 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 322 may be used to enter preferences of a user of the mobile device 300 to define how the user wishes certain calls from third parties to be handled by the wireless communication network, as previously described herein.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
setting a user designated preference in configurations for managing received mobile notifications being stored in a mobile device;
identifying a plurality of mobile notifications in the received mobile notifications, the plurality of notifications including a first mobile notification associated with a first application, and a second mobile notification associated with a second application;
determining the plurality of mobile notifications are associated with a shared category of content;
displaying, via a user interface of the mobile device, the plurality of mobile notifications in a folder based at least in part on the user designated preference, and further based at least in part on the determining of the plurality of the mobile notifications being associated with the shared category; and
clearing a group of mobile notifications in the plurality of mobile notifications associated with the shared category, based at least in part on a first number of the plurality of mobile notifications being greater than or equal to a threshold number of mobile notifications, the group of mobile notifications being cleared further based on a difference between a current time and a previous mobile notification clear time being greater than or equal to a threshold difference, a second number of remaining mobile notifications associated with the shared category in the folder being less than the threshold number of mobile notifications.

2. The method of claim 1, further comprising:
receiving, via the user interface, input associated with a second request indicating the threshold number of mobile notifications;
determining a third number of mobile notifications in a second folder; and
clearing a third mobile notification associated with a third application and in the second folder, based at least in part on the third number of mobile notifications in the second folder being equal to the threshold number of mobile notifications.

3. The method of claim 1, further comprising:
setting a second user designated preference indicating the threshold number of mobile notifications, and
clearing a third mobile notification in a second folder based at least in part on the second user designated preference, and further based at least in part on the third mobile notification having arrived earlier in the second folder than remaining mobile notifications in the second folder.

4. The method of claim 1, further comprising:
prior to clearing the group of mobile notifications, providing, via the user interface, an alert; and
in response to the alert, receiving, via the user interface, input associated with a verification to clear the group of mobile notifications.

5. The method of claim 1, further comprising:
setting a second user designated preference indicating one or more predefined recipients; and
automatically sending third mobile notifications received at the mobile device to the one or more predefined recipients based at least in part on the second user designated preference.

6. The method of claim 1, further comprising:
displaying, via the user interface and in the folder, a name associated with the category, and an indicator comprising a third number of mobile notifications in the folder.

7. The method of claim 1, further comprising:
setting, based at least in part on input received via the user interface, a second user designated preference indicating the threshold number of mobile notifications;
displaying, via the user interface and in a second folder, a third mobile notification based at least in part on the third mobile notification being associated with a second category; and
clearing the third mobile notification based at least in part on the second user designated preference, and further based at least in part on the third mobile notification having arrived earlier in the second folder than remaining mobile notifications in the second folder.

8. The method of claim 1, further comprising:
displaying a predetermined number of mobile notifications in the folder based upon an order of receipt associated with each mobile notification in the folder.

9. The method of claim 1, wherein clearing a third group of mobile notifications is further based at least in part on at least one of a mobile notification clear request being received.

10. A mobile device comprising:
a user interface;
a processor; and
programming instructions that, when executed by the processor, program the mobile device to perform operations including:
  setting a user designated preference in configurations for managing received mobile notifications being stored in the mobile device;
  identifying a plurality of mobile notifications in the received mobile notifications, the plurality of mobile notifications including a first mobile notification associated with a first application, and a second mobile notification associated with a second application;
  determining the plurality of mobile notifications are associated with a shared category of content;
  displaying, via the user interface, the plurality of mobile notifications in a folder based at least in part on the user designated preference, and further based at least in part on the determining of plurality of mobile notifications being associated with the shared category; and
  clearing a group of mobile notifications in the plurality of mobile notifications associated with the shared category, based at least in part on a first number of the plurality of mobile notifications being greater than or equal to a threshold number of mobile notifications, the group of mobile notifications being cleared further based on a difference between a current time and a previous mobile notification clear time being greater than or equal to a threshold difference.

11. The mobile device of claim 10, the operations further comprising:
receiving, via the user interface, input associated with a second request indicating the threshold number of mobile notifications;
determining a second number of mobile notifications in a second folder; and
clearing a third mobile notification associated with a third application and in the second folder, based at least in part on the second number of mobile notifications in the second folder being equal to the threshold number of mobile notifications.

12. The mobile device of claim 10, the operations further comprising:
setting a second user designated preference indicating the threshold number of mobile notifications, and
clearing a third mobile notification in a second folder based at least in part on the second user designated preference, and further based at least in part on the third mobile notification having arrived earlier in the second folder than remaining mobile notifications in the second folder.

13. The mobile device of claim 10, the operations further comprising:
prior to clearing the group of mobile notifications, providing, via the user interface, an alert; and
in response to the alert, receiving, via the user interface, input associated with a verification to clear the group of mobile notifications.

14. The mobile device of claim 10, the operations further comprising:
setting a second user designated preference indicating one or more predefined recipients; and
automatically sending third mobile notifications received at the mobile device to the one or more predefined recipients based at least in part on the second user designated preference.

15. The mobile device of claim 10, further comprising:
receiving a mobile notification clear request,
wherein clearing the group of mobile notifications is further based at least in part on the mobile notification clear request, and
wherein a second number of remaining mobile notifications associated with the shared category in the folder is less than the threshold number of mobile notifications.

16. A method comprising:
setting a user designated preference in configurations for managing received mobile notifications being stored in a mobile device;
identifying a plurality of mobile notifications in the received mobile notifications, the plurality of mobile notifications including a first mobile notification associated with a first application, and a second mobile notification associated with a second application;
determining the plurality of mobile notifications are associated with a shared category of content;
displaying, via a user interface of the mobile device, the plurality of mobile notifications in a folder based at least in part on the user designated preference, and further based at least in part on the determining of the plurality of mobile notifications being associated with the shared category; and
clearing a group of mobile notifications in the plurality of mobile notifications associated with the shared category, based at least in part on a number of the plurality of mobile notifications being greater than or equal to a threshold number of mobile notifications, the group of mobile notifications being cleared further based on a difference between a current time and a previous mobile notification clear time being greater than or equal to a threshold difference.

17. The method of claim 16, further comprising:
prior to clearing the group of mobile notifications, providing, via the user interface, an alert; and
in response to the alert, receiving, via the user interface, input associated with a verification to clear the group of mobile notifications.

18. The method of claim 16, further comprising:
setting a second user designated preference indicating one or more predefined recipients; and
automatically sending third mobile notifications received at the mobile device to the one or more predefined recipients based at least in part on the second user designated preference.

19. The method of claim 16, wherein the group of mobile notifications includes at least one of the first mobile notification or the second mobile notification, further comprising:
recovering, based at least in part on third input received via the user interface, one or more of the at least one of the first mobile notification or the second mobile notification.

20. The method of claim 16,
wherein a second number of remaining mobile notifications associated with the shared category in the folder is less than the threshold number of mobile notifications.

* * * * *